(12) United States Patent
Benzler et al.

(10) Patent No.: US 9,630,604 B2
(45) Date of Patent: Apr. 25, 2017

(54) METHOD FOR OPERATING A BRAKE SYSTEM FOR A VEHICLE AND CONTROL DEVICE FOR A BRAKE SYSTEM OF A VEHICLE

(71) Applicant: Robert Bosch GmbH, Stuttgart (DE)

(72) Inventors: Steffen Benzler, Eberdingen (DE); Jochen Bodmann, Oberstenfeld (DE); Yasutaka Nagakura, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 268 days.

(21) Appl. No.: 14/257,682

(22) Filed: Apr. 21, 2014

(65) Prior Publication Data

US 2014/0319902 A1 Oct. 30, 2014

(30) Foreign Application Priority Data

Apr. 24, 2013 (DE) .......................... 10 2013 207 417
Mar. 26, 2014 (DE) .......................... 10 2014 205 645

(51) Int. Cl.
*B60T 13/58* (2006.01)
*B60T 13/68* (2006.01)
*B60T 7/04* (2006.01)
*B60T 13/14* (2006.01)
*B60T 13/66* (2006.01)
(Continued)

(52) U.S. Cl.
CPC ............ *B60T 13/586* (2013.01); *B60T 7/042* (2013.01); *B60T 13/146* (2013.01); *B60T 13/662* (2013.01); *B60T 13/686* (2013.01); *B60T 13/745* (2013.01); *B60T 8/4872* (2013.01)

(58) Field of Classification Search
CPC .... B60T 13/145; B60T 13/146; B60T 13/662; B60T 13/68; B60T 13/686; B60T 13/745; B60T 13/586
USPC .............. 188/356, 357, 358, 359; 303/3, 20, 303/114.1, 114.3, 116.1, 119.1, 115.2
See application file for complete search history.

(56) References Cited

U.S. PATENT DOCUMENTS 5,853,229 A 12/1998 Willmann et al.
8,123,310 B2 * 2/2012 Haupt ....................... B60L 7/26
303/152
(Continued)

FOREIGN PATENT DOCUMENTS

DE 196 04 134 8/1997

*Primary Examiner* — Thomas J Williams
(74) *Attorney, Agent, or Firm* — Gerard Messina

(57) ABSTRACT

A method for operating a brake system for a vehicle, the brake system including a master brake cylinder coupled to an electromechanical brake booster having a booster body. The method involves: From an initial position, displacing the booster body relative to the master brake cylinder by an adjusting travel in the direction towards the master brake cylinder into an end position; from the end position, displacing the booster body relative to the master brake cylinder by the same adjusting travel in an opposite direction away from the master brake cylinder back into the initial position; during the step of displacing the booster body from the end position back into the initial position, sucking hydraulic fluid from wheel brake devices that coupled in a fluid manner with the brake system and assigned to wheels of the vehicle, for the reduction of a hydraulic fluid pressure existing in the wheel brake devices.

10 Claims, 4 Drawing Sheets

(51) Int. Cl.
*B60T 13/74* (2006.01)
*B60T 8/48* (2006.01)

(56) References Cited

U.S. PATENT DOCUMENTS

| | | | | |
|---|---|---|---|---|
| 8,315,754 B2* | 11/2012 | Ajiro | ............. | B60T 1/10 |
| | | | | 701/22 |
| 2012/0144823 A1* | 6/2012 | Usui | ............. | B60T 13/745 |
| | | | | 60/545 |
| 2013/0169032 A1* | 7/2013 | Linhoff | ............. | B60L 7/26 |
| | | | | 303/3 |
| 2014/0028083 A1* | 1/2014 | Gerdes | ............. | B60T 1/10 |
| | | | | 303/6.01 |
| 2014/0244127 A1* | 8/2014 | Strengert | ............. | B60T 1/10 |
| | | | | 701/70 |
| 2015/0028664 A1* | 1/2015 | Choi | ............. | B60T 8/4077 |
| | | | | 303/3 |
| 2015/0307072 A1* | 10/2015 | Strengert | ............. | B60T 8/3265 |
| | | | | 303/81 |

\* cited by examiner

METHOD FOR OPERATING A BRAKE SYSTEM FOR A VEHICLE AND CONTROL DEVICE FOR A BRAKE SYSTEM OF A VEHICLE

FIELD OF THE INVENTION

The present invention relates to a method for operating a brake system for a vehicle and a control device for a brake system of a vehicle.

BACKGROUND INFORMATION

In German Published Patent Appln. No. 196 04 134, a method and a device are described for controlling a brake system of a motor vehicle having an electric drive. During the braking of the vehicle, while using the electric drive for simultaneously charging a battery, the hydraulic brake torque exerted upon at least one wheel by the at least one wheel brake cylinder of the hydraulic brake system is supposed to be reduced/prevented in spite of an operation of the brake pedal by the driver. In addition, by opening the wheel outlet valve of the hydraulic brake system, the pressure medium displaced from the master brake cylinder is supposed to be transferred via the at least one wheel brake cylinder into at least one storage device, which may be a low-pressure accumulator. In this way, regenerative braking carried out by the electric drive is supposed to be blendable.

SUMMARY

The present invention creates a method for operating a brake system for a vehicle, as well as a control device for a brake system of a vehicle, and a brake system for a vehicle.

To reduce the energy demand in motor vehicles which are driven exclusively or additionally by an electric motor, braking may be carried out, at least partially, with the aid of an electric motor which is operable as a generator.

In order to be able to carry out the function "regenerative braking" without a reaction, perceptible by the driver, in the form of deceleration fluctuations or pedal force changes or route changes, at the same time maintaining optimal utilization of the generator potential, special actuating strategies and/or changes in the brake system are advantageous. The present invention supplies suitable actuating strategies for regenerative braking. At the same time, the present invention ensures that, based on a speed-dependent availability of the (absolute) braking torque of an electric generator (especially at high speeds and shortly before reaching a standstill) in a transitional manner, the driver's braking request is able to be satisfied with the aid of an additional hydraulic brake torque of the wheel brake cylinder.

In one execution of the present invention, the brake fluid volume displaced from the master brake cylinder by the driver using the brake pedal (from here on, the concepts "brake fluid" and "hydraulic fluid" will be used synonymously) at corresponding availability of a sufficient regenerative braking torque is displaced into at least one low-pressure accumulator device (such as a low-pressure accumulator chamber), in order to prevent an hydraulic brake pressure buildup in the wheel brakes. In order to make possible the emptying of the low-pressure accumulator device when needed, it has a return spring as a rule, which is able to apply a so-called minimum expulsion force. Because of the return spring, however, during the displacement of the brake fluid volume into the at least one low-pressure accumulator device, a residual pressure is created at the wheel brakes of approximately 1 to 3 bar. Using the present invention, this residual pressure is able to be reduced, so that undesired residual grinding torques on the wheel brakes are able to be eliminated/prevented. This raises the efficiency of the brake system and counteracts wear of the brake linings (such as brake disks or brake areas). Thus, the present invention improves the efficiency of recuperation of a brake system operated by it, and raises its service life.

To keep up its pedal travel/pedal force characteristic during the purely regenerative (or "recuperative") braking, of the purely hydraulic braking or in transition phases ("blending"), in the present invention, an electromechanical brake booster is used. Such an electromechanical brake booster offers the possibility of a variable force translator. The change in the force transmission is achieved by changing the supporting force, by changing the difference in length between an input and output element (or rather, an input and output rod of the electromechanical brake booster).

The present invention also utilizes the electromechanical brake booster to change the differential travel between its input rod and booster body (or rather between its input and output rod), in order, in this manner, to reduce or remove a residual pressure present in the wheel brakes and the residual brake moment that goes with it.

Because of the method according to the present invention, a reduction in residual grinding torques promoting undesired, premature wear at the wheel brake cylinders and the brake linings and thus also the brake disks, on which the wheel brake cylinders or pistons act) is achievable, in the case of regenerative brake systems, with the aid of an electromechanical brake booster, for instance, in connection with an ESP-hev-X+iBooster, in which a reduction in the residual pressure is able to increase the energy efficiency of the system in response to purely regenerative braking.

In one advantageous specific embodiment of the method according to the present invention, if, during the step of displacing the booster body relative to the master brake cylinder, an increased driver braking request takes place, the booster body is immediately displaced into its initial position, and a step is carried out of opening the at least one wheel outlet valve as a function of a quantity of the hydraulic fluid volume displaced by the driver and/or as a function of the master brake cylinder pressure, so that hydraulic fluid is able to flow away into the at least one fluid storage device.

The at least one fluid storage device may be a low-pressure accumulator, for example. In particular, at least one cost-effective low-pressure accumulator may be used.

In a further advantageous specific embodiment, the booster body is displaced as a function of a temperature of the hydraulic fluid and/or of the surroundings thereof and/or a ram pressure of the hydraulic fluid existing in the brake system at a corresponding speed rate.

Besides that, in the step of displacing the booster body back into the initial position, the booster body may be displaced slightly over the initial position. This enables a greater pressure reduction in the at least one brake circuit.

In a supplementary way, in response to a reduction in the driver's braking request, a corresponding release of pressure of the hydraulic fluid in the master brake cylinder may be taken advantage of in the wheel brake devices, by, directly after the detection of the reduction of the driver's braking request, controlling all the wheel outlet valves of the brake system into their closed state, so that hydraulic fluid is sucked from the wheel brake devices.

During the step of displacing the booster body from the end position back into the initial position, a first switch-over valve of the first brake circuit in its opened state and a second switch-over valve of a second brake circuit of the brake system may be controlled to go into its opened state. Alternatively, however, during the step of displacing the booster body from the end position back into the initial position, the first switch-over valve of the first brake circuit developed as the primary circuit may be controlled into its closed state and the second switch-over valve of the second brake circuit developed as the secondary circuit may be controlled into its opened state.

The advantages described above are also ensured in the case of a corresponding control device for a brake system of a vehicle and in the case of a brake system for a vehicle having such a control device. It should be pointed out that the control device according to the specific embodiments described above may also be developed further.

DETAILED DESCRIPTION

Figure 1:
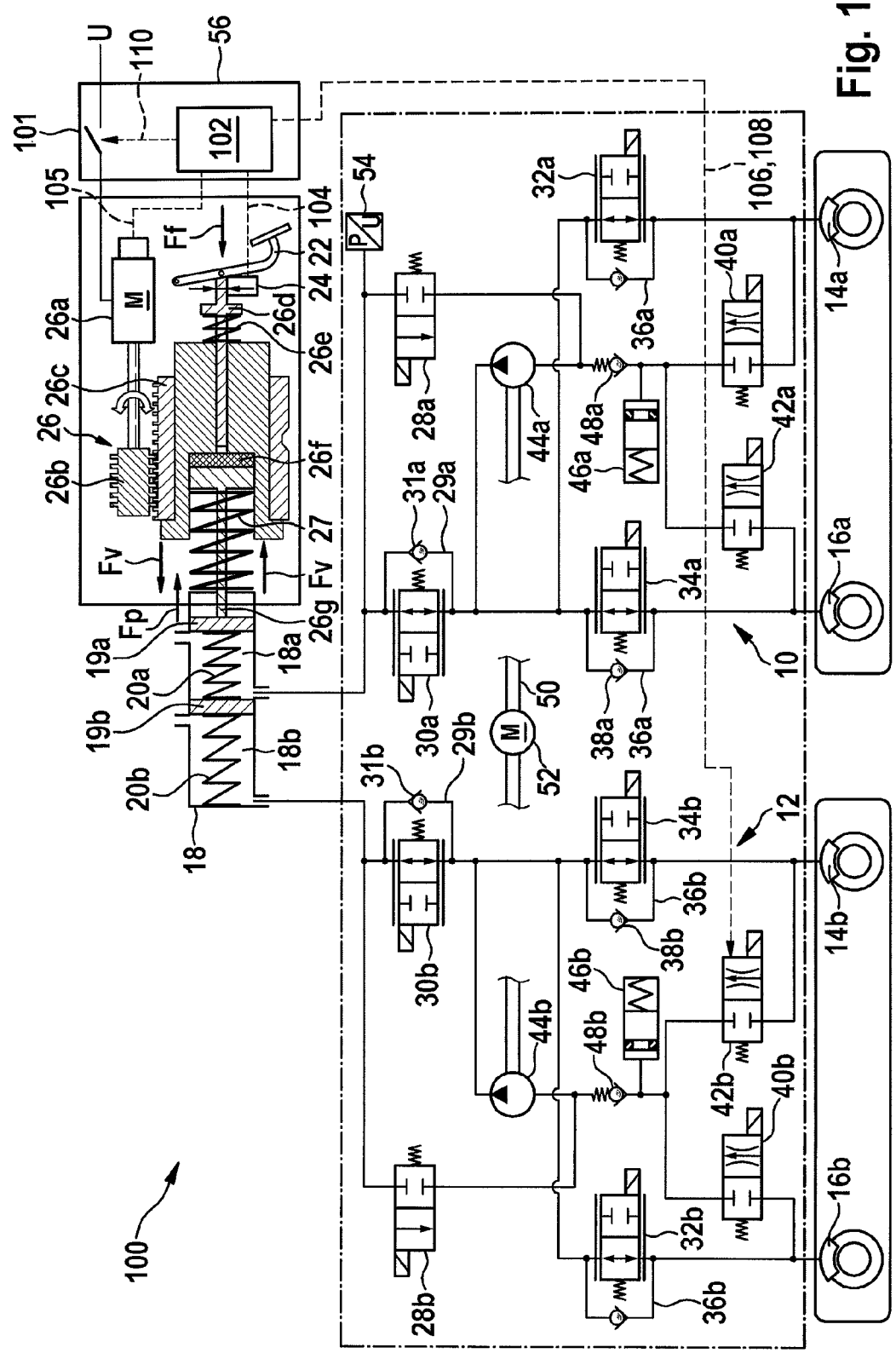
FIG. 1 a schematic representation of an exemplary brake system equipped with one specific embodiment of the control device.

FIG. 1 shows a schematic representation of an exemplary brake system equipped with one specific embodiment of the control device.

The brake system 100 reproduced schematically in FIG. 1 is advantageously usable, for instance, in a hybrid vehicle and in an electric vehicle. However, the usability of control device 101 is not limited to the use of brake system 100 in a hybrid vehicle or an electric vehicle.

Brake system 100 has a first brake circuit 10 and a second brake circuit 12 each having at least one wheel brake cylinder 14a, 14b, 16a and 16b. In an optional manner, each of the two brake circuits 10 and 12 has a first wheel brake cylinder 14a or 14b and a second wheel brake cylinder 16a and 16b. In a preferred manner, in this case, first wheel brake cylinder 14a of first brake circuit 10 and second wheel brake cylinder 16a of first brake circuit 10 are assigned to different vehicle axles, first wheel brake cylinder 14b of second brake circuit 12 and second wheel brake cylinder 16b of second brake circuit 12 being also assigned to different vehicle axles. In particular, first wheel brake cylinders 14a and 14b may be assigned to the rear axle, while second wheel brake cylinders 16a and 16b are assigned to the front axle. However, the subsequently described brake system 100 is not limited to such a brake circuit subdivision (X-brake circuit subdivision).

Brake system 100 has a master brake cylinder 18, which is able to be executed as a tandem master brake cylinder, for example. Master brake cylinder 18 may have at least one adjustable piston 19a and 19b, each of which is at least partially displaceable in at least one pressure chamber 18a or 18b of master brake cylinder 18. Master brake cylinder 18 preferably includes a first displaceable piston 19a that may be designated as piston rod 19a, which extends at least partially into a first pressure chamber 18a, assigned to first brake circuit 10, of master brake cylinder 18 (having a first return spring 20a) and a second displaceable piston 19b that may be designated as floating piston 19b, which extends at least partially into a second pressure chamber 18b, assigned to second brake circuit 12, of master brake cylinder 18 (having a second return spring 20b). Main brake cylinder 18 may be connected to a brake fluid reservoir (not sketched) via at least one hydraulic fluid or brake fluid exchange opening such as a snifting bore, for example. The usability of control device 101 is not limited, however, to the use of a tandem master brake cylinder or to a certain design of master brake cylinder 18 of brake system 100.

Brake system 100 preferably has a brake operating element 22, such as a brake pedal, situated on master brake cylinder 18. Brake operating element 22 is advantageously situated on master brake cylinder 18 in such a way that, if brake operating element 22 is operated with at least a minimum operating force, a driver braking force Ff applied to brake operating element 22 is able to be transmitted to the at least one displaceable piston 19a and 19b, such as, for instance, on piston rod 19a and floating piston 19b, in such a way that the at least one piston 19a and 19b is displaceable using driver braking force Ff. Using this displacement of the at least one piston 19a and 19b, an internal pressure may be increased in at least one pressure chamber 18a and 18b of master brake cylinder 18.

Brake system 100 preferably also includes at least one brake operating element sensor 24, using which the operating force of the operation of brake operating element 22 is ascertainable by the driver. The at least one brake operating element sensor 24 may be, for example, a pedal-travel sensor, a differential-travel sensor and/or a rod-travel sensor. In order to record the operating force that corresponds to the driver's braking intent, however, a different type of sensor system may also be used instead of, or in addition to the sensor types enumerated here.

Brake system 100 also has a brake booster 26. Using brake booster 26, a booster force Fv may be exerted in such a way on the at least one piston 19a and 19b of master brake cylinder 18, that the operation of brake operating element 22 is made easier for the driver. Boosting force Fv acts, in this case, together with driver braking force Ff, counter to a return force Fr of a return spring 27 and a pressure force Fp effected by the inside pressure in at least one pressure chamber 18a or 18b of master brake cylinder 18.

Brake booster 26 is an electromechanical (i.e. continuously regulatable/continuously controllable brake booster 26. An electromechanical brake booster 26 is distinguishable by having a variable booster force Fv. Brake booster 26 of FIG. 1 includes a motor 26a, a transmission 26b, a booster 26c, an input rod 26d, a differential travel spring 26e, a reaction disk 26f and an output rod 26g. With these items, it is possible, using electromechanical brake booster 26, in a simple manner to influence the brake operating force perceptible to the driver during braking.

With reference to FIG. 1, we shall now briefly describe further components of the specific embodiment of brake system 100. It is explicitly pointed out that the components of brake system 100 described subsequently represent only an example of a possible design of a brake system 100 that is operable using control device 101. One advantage of control device 101 that is described in greater detail below is that brake circuits 10 and 12 cooperating with it are not tied to a certain design or to the use of certain components. Instead, brake circuits 10 and 12 may be modified with great freedom of choice, without their usability and the advantages of control device 101 being impaired.

Each brake circuit 10 and 12 is designed so that the driver is able to brake via master brake cylinder 18 directly into wheel brake cylinders 14a, 14b, 16a and 16b. Each brake circuit 10 and 12 has a high-pressure switching valve 28a or 28b and a switch-over valve 30a or 30b (each having a bypass line 29a and 29b running in parallel and a check valve 31a and 31b situated in each bypass line 29a and 29b). In first brake circuit 10, a first wheel inlet valve 32a is assigned to first wheel brake cylinder 14a and a second wheel inlet valve 34a is assigned to second wheel brake cylinder 16a, in each case having a parallel running bypass line 36a and a check valve 38a situated in each bypass line 36a. In addition, in first brake circuit 10 a first wheel outlet valve 40a is assigned to first wheel brake cylinder 14a and a second wheel outlet valve 42a is assigned to second wheel brake cylinder 16a. Correspondingly, in second brake circuit 12 a first wheel inlet valve 32b is assigned to first wheel brake cylinder 14b and a second wheel inlet valve 34b is assigned to second wheel brake cylinder 16b. Parallel to each of the two wheel inlet valves 32b and 34b of second brake circuit 12 there runs in each case a bypass line 36b each having a check valve 38b situated in it. Furthermore, in second brake circuit 12 a first wheel outlet valve 40b is also assigned to first wheel brake cylinder 14b and a second wheel outlet valve 42b is assigned to second wheel brake cylinder 16b.

In addition, each brake circuit 10 and 12 includes a pump 44a and 44b, whose suction side is connected to wheel outlet valves 40a and 42a or 40b and 42b, and whose conveying side is directed to wheel inlet valves 32a and 34a or 32b and 34b. Each of brake circuits 10 and 12 has, in addition, an accumulator device or an accumulator chamber 46a or 46b situated between wheel outlet valves 40a and 42a or 40b and 42b and associated pump 44a or 44b, as fluid accumulator device/accumulator volume 46a or 46b and a safety valve 48a or 48b lying between respective pump 44a or 44b and accumulator chamber 46a or 46b. Each of accumulator chambers 46a and 46b may, in particular, be a low-pressure accumulator chamber. Let it be pointed out that accumulator chambers 46a and 46b are able to be used as ESP accumulator chambers in both brake circuits 10 and 12.

Pumps 44a and 46b may be situated on a common shaft 50 of a motor 52. Each pump 44a and 44b may be developed as a three-piston pump. Instead of a three-piston pump, however, another type of pump may be used for at least one of pumps 44a and 44b. Differently executed modulation systems, such as pumps having more or fewer pistons, asymmetrical pumps or gear pumps may also be used. Brake system 100 cooperating with control device 101 may thus be executed as a modified standard modulation system, especially as a six-piston ESP system.

In addition, each of the two brake circuits 10 and 12 is able to include at least one pressure sensor 54, particularly for ascertaining a hydraulic fluid inlet pressure and/or a circuit pressure.

Brake system 100 described above is able to be actuated using control device 101 described further on. However, it is pointed out once more that the use of control device 101 described further on is not limited to the cooperation with a brake system 100 thus developed.

Control device 101 described further on may be integrated, in particular, into a control electronics system 56 of brake booster 26 or into a control electronics system of brake system 100. It is pointed out, however, that the developmentability of control device 101 is not limited to such an integration. For example, control device 101 may also be used together with a control electronics system 56 of brake booster 26, developed and situated separately from it and/or the control electronics system of brake system 100.

Control device 101 includes an actuating device 102, whereby at least one first wheel outlet valve 40a and 40b of at least one first wheel brake cylinder 14a and 14b of at least one of brake circuits 10 and 12 is able to be actuated. The actuation at least of the at least one first wheel outlet valve 40a and 40b by actuating device 102 takes place while taking into account at least one provided sensor signal 104 with respect to an operating force of an operation of brake operating element 22 situated on master brake cylinder 18 by a driver of the vehicle.

For instance, brake operating element sensor 24, as sensor signal 104, is able to provide a pedal travel, a rod travel, a driver brake pressure and/or driver braking force Ff, or an equivalent variable, to actuating device 102. A signal 105 of a sensor 58 of brake booster 26, such as an angle of rotation sensor, may optionally also be able to be taken into account by actuating device 102. In an optional manner, at least one more information with reference to a maximally executable generator braking torque, using at least one (not shown) electric motor operable as a generator of brake system 100 may be providable to actuating device 102 and be evaluable by it.

Actuating device 102 is designed to actuate at least one first wheel outlet valve 40a and 40b of brake circuits 10 and 12 in such a way that a braking pressure buildup is able to be limited at least in one of the two brake circuits 10 and 12 to a response pressure of the fluid accumulator device (of accumulator volume/accumulator chamber 46a and 46b) of respective brake circuit 10 and 12 (in spite of a brake fluid or hydraulic fluid displaced from the master brake cylinder of brake system 100 into brake circuits 10 and 12). For this, actuating device 102 (at least at times) during an increasing operating force of the operation of brake operating element 22, emits a first control signal 106 to the at least one first wheel outlet valve 40a and 40b.

In addition, using actuating device 102, electromechanical brake booster 26, while taking into account at least the provided sensor signal 104, is also able to be actuated in such a way that, while the at least one first wheel outlet valve 40a, 40b remains open, a booster body 26c of electromechanical brake booster 26 is able to be displaced from an initial position relative to master brake cylinder 18 in the direction towards master brake cylinder 18 by a specified adjustment path into an end position, whereby a travel differential between an input rod 26d of the electromechanical brake booster 26 and booster body 26c is able to be raised, and, after the at least one first wheel outlet valve 40a and 40b has been controlled using actuating device 102 by a second control signal 108 to a closed state, booster body 26c is displaceable from the end position relative to master brake cylinder 18 in an opposite direction away from master brake cylinder 18, back by the same displacement travel into the initial position, whereby the travel differential between input rod 26d and booster body 26c is reducible in such a way that an internal pressure present in master brake cylinder 18 is reducible using the actuated brake booster 26. In particular, the internal pressure in master brake cylinder 18 is reducible in such a way, using brake booster 26 actuated by an additional control signal 110, that hydraulic fluid is able to be sucked from wheel brake devices 14a, 14b, 16a and 16b, and the brake pressure in at least one brake circuit 10 and 12 is additionally able to be reduced to below the response pressure of the fluid accumulator device (of the accumulator volume/accumulator chamber). For example, a supply voltage U of brake booster 26 may be variable using the additional control signal 110.

The reduction of the internal pressure in master brake cylinder 18 has the effect, based on the simultaneously present open switch-over valve 30a or 30b, of a brake fluid displacement (from brake circuits 10 and 12 via the opened switch-over valves 30a or 30b into master brake cylinder 18) whereby the pressure present in brake circuits 10 and 12 is able to be reduced additionally below the response pressure of accumulator chambers 46a and 46b used as fluid accumulator devices/accumulator volumes 46a and 46b of brake circuits 10 and 12. In this way, the braking pressure present is also reducible in first wheel brake cylinders 40a and 40b, via which (at least at times) during an increasing operating force of the operation of brake operating element 22, brake fluid is displaced and its first wheel inlet valves 32a and 32b are therefore present in an open state. Because of the effected reduction in the brake pressure in first wheel brake cylinders 40a and 40b, a certain wear of their brake linings may be prevented/reduced. With that, control device 101 may also be used to protect the brake linings.

The brake pressure reduction, effected in brake circuits 10 and 12, below the response pressure of accumulator chambers 46a and 46b used as fluid accumulator devices/accumulator volumes 46a and 46b may be used for an increase in a generator braking torque carried out using the at least one electric motor (not sketched). Consequently, a battery (not shown here) of the vehicle, equipped with brake system 100, is able to be charged more rapidly, without thereby changing a vehicle deceleration specified by a driver using the operation of brake operating element 22.

Brake system 100 equipped with control device 101 thus unites the advantages of a high recuperation efficiency with the applicability of blending. In addition, it is possible, by using control device 101, to carry out the blending without carrying out reactions on brake operating element 22 that are perceptible to the driver. Above all, within the jump-in range, the blending is not perceptible to the driver on brake operating element 22/brake pedal 22. Outside the jump-in range, the primary increase in the travel differential (or the differential travel) has the effect at most that the driver experiences operating element 22/brake pedal 22 as being "softer". But this is noted by many drivers as advantageous compared to a "stiffer" brake operating element 22/brake pedal 22. To the extent that even perceiving brake operating element 22/brake pedal 22 as "softer" is not desired, the blending process may be carried out more slowly outside the jump-in range.

We explicitly point out that the advantages described above come about independently of the magnitude of the response pressure of accumulator chambers 46a and 46b utilized as fluid accumulator device/accumulator volumes 46a and 46b of brake circuits 10 and 12. The response pressure of fluid accumulator device/accumulator volume 46a and 46b of brake circuits 10 and 12 may thus also be comparatively high. Consequently, cost-effective accumulator volumes 46a and 46b may also be used together with control device 101.

In addition, control device 101 may also be designed for the purpose of carrying out jointly the method steps described below. A more accurate description of additional implementable functionalities of control device 101 is thus dispensed with in this case.

Figure 2A:
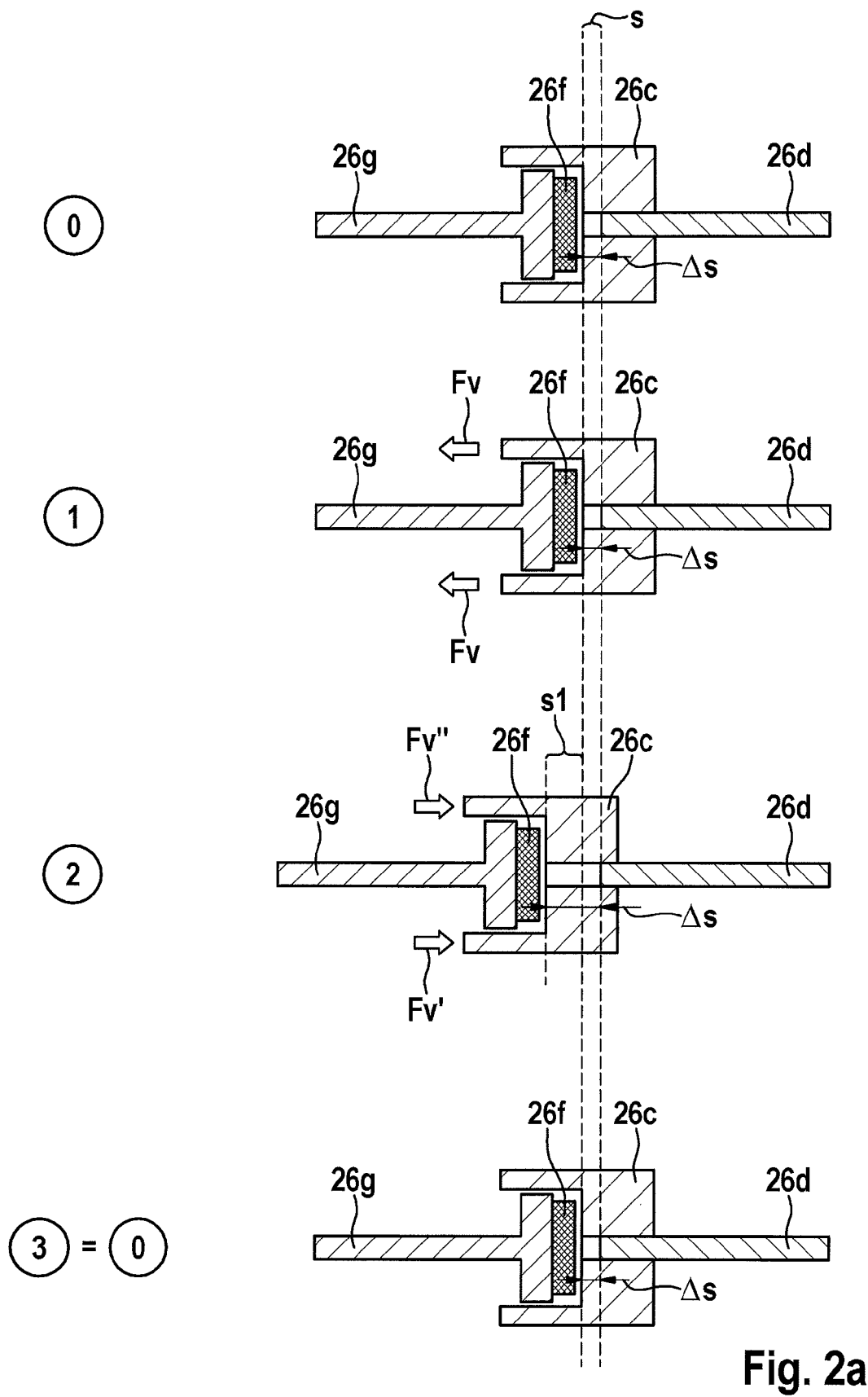
FIGS. 2a and 2b detailed cross-sectional views of a part of an electromechanical brake booster and time-dependent diagrams for explaining a first specific embodiment of the method for operating a brake system for a vehicle.
Figure 2B:
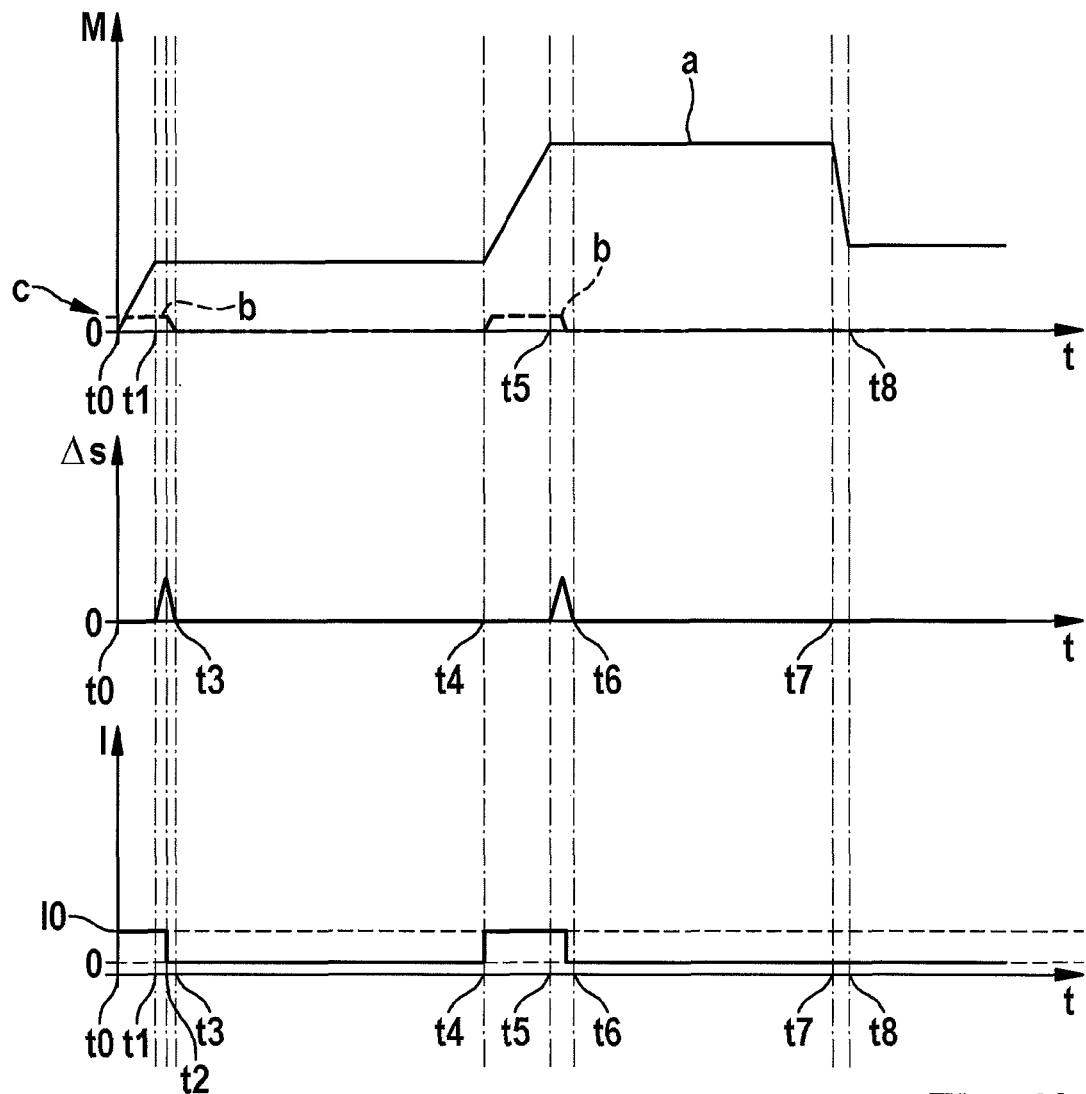

FIGS. 2a and 2b show detailed cross-sectional views of a part of an electromechanical brake booster and time-dependent diagrams for explaining a first specific embodiment of the method for operating a brake system for a vehicle.

For example, the method reproduced with the aid of FIGS. 2a and 2b is executed using brake system 100 that is shown schematically in FIG. 1. The method described below, however, may also be carried out using other brake system types.

FIG. 2a shows four detail cross sectional views of the same cutout of brake booster 26 shown in FIG. 1, in each case input rod 26d, output rod 26g, booster body 26c as well as reaction disk 26f coupled to output rod 26g being shown. The four views each correspond to different operating states, which are characterized by digits 0, 1, 2 and 3 (located in circles in the drawing next to the respective cross sectional views), the digit "0" representing an operating state "initial position", digit "1" an operating state "booster body beginning to be displaced forwards (i.e. in the drawing toward the left)", digit "2" an operating state "booster body beginning to be displaced back" and digit "3" the operating state to which digit "0" corresponds, namely, "initial position reached again".

As characterizes a travel differential of input rod 26d and booster body 26c. Travel differential Δs is frequently also designated as differential travel between input rod 26d booster body 26c. A detailed explanation of FIG. 2a will be found further below.

FIG. 2b shows three different time-dependent diagrams, that is, on the abscissa there is in each case shown a curve over time, with time t in seconds, for example. The diagram at the top of the drawing represents braking torque M in bar on the ordinate, a curve identified with the letter "a" and shown by a solid line reproducing the regenerative braking torque or the driver's braking request, and a curve characterized by a letter "b", shown as a dashed line, reproducing the hydraulic brake torque. As point of reference, letter "c" characterizes a value of 1 to 3 bar, for example.

In the middle diagram, on the ordinate, travel differential Δs (in mm) is plotted between input rod 26d and the booster body over a time t. The "peak-like" curve shape corresponds to the transition between operating states "1" and "2" (in each case "there and back") shown in FIG. 2a. The value "0" on the ordinate in the middle diagram corresponds to operating states "0" and "3" in FIG. 2a.

The diagram located at the bottom of the drawing in FIG. 2b states the application of current I of the first outlet valve on the ordinate, the outlet valves developed closed when currentless being open at a current strength of 10 and closed at a current strength equal to zero.

The three diagrams are aligned time-wise to one another, times t0 to t8 representing special points in time, as will be explained below. As of time t0, the driver requests a braking torque unequal to zero. In order to be able to fulfill the requested braking torque purely regeneratively, as of time t0, at least the first wheel outlet valves of the brake system are controlled to their open state. (This takes place while taking into account at least the sensor signal, described above, with respect to an operating force of an operation of a brake operating element situated on the master brake cylinder. In this way, a braking pressure buildup in the brake circuits is able to be limited to a response pressure of the fluid accumulator devices.

Now if, with regard to FIGS. 2a and 2b, a constant driver braking request or a very small pedal speed is detected (see in FIG. 2b at time t1 and in FIG. 2a state "0" identified in the circle), a purely regenerative braking is present (target pressure in the brake system=0 bar). This may be ensured by carrying out the method steps described below. (It is pointed out that a pressure measurement of the carrying out of the method steps is not required.)

First of all, at the beginning of the so-called active phase (time t1 to t3 in FIG. 2b) of the method, booster body 26c is displaced from an initial position relative to the master brake cylinder in the direction towards the master brake cylinder, by a specified adjustment path s1 into an end position, in order to increase a travel differential Δs between input rod 26d and booster body 26c. While at time t1/in state "1" travel differential Δs is already at a value s0 (unequal zero), at time t1/in state "2", travel differential Δs between input rod 26d and booster body 26c already amounts to a value s0+s1. Another way of saying this is that booster body 26c is displaced by the additional adjusting path s1 although no increase in the driver's braking request is to be discovered. While in the initial position of booster body 26c a travel differential Δs corresponding to a specified relationship is present between input rod 26d and booster body 26c, booster body 26c may be located in the end position in a position deviating from the specified relationship. (As the relationship, a ratio of a current position of input rod 26d and travel differential Δs may be specified). We should point out that, during the step of displacing booster body 26c, the first wheel outlet valve of each brake circuit remains open. The brake fluid displaced by master brake cylinder 18, using the displacing of booster body 26c, gets through the opened first wheel outlet valves into the at least one fluid accumulator device (e.g. the low-pressure accumulator).

After output rod 26g of electromechanical brake booster 26 has reached its target position or end position, the first outlet valves are closed (time t2 in FIG. 2b). Thereafter, booster body 26c is displaced back again to its original position (initial position) $s_1$ by the same displacement path s1 (times t2 to t3 in FIG. 2b). One may also describe this as a displacing of booster body 26c from the end position relatively to the master brake cylinder in an opposite direction away from the master brake cylinder, by the same adjustment path s1 back into the initial position, which is carried out in order to reduce travel differential Δs between input rod 26d and booster body 26c. During the step of displacing booster body 26c from the end position back into the initial position, the first wheel outlet valves remain closed. Therefore, during this backward motion (see state "2" in FIG. 2a) brake fluid is sucked, at closed outlet valves, from wheel brake devices into the master brake cylinder, and the residual pressure still located in the brake system and the residual torque at the wheel brake devices are reduced.

This is followed by the so-called passive phase of the method (times t3 to t4 in FIG. 2b), at which the outlet valves remain closed, until the driver has displaced a maximum admissible brake fluid volume, by increasing the brake pedal travel, into the wheel brake devices or the master brake cylinder pressure or the wheel brake cylinder pressure has exceeded the pressure prevailing in the fluid accumulator device/low-pressure accumulator chamber. Since raising the system pressure in response to a reduction in the driver's braking request is able to be excluded, during the pedal travel reduction the system may dwell in the passive mode, and the outlet valves may remain closed.

The amplitude of booster body 26c required may be determined with the aid of the pressure difference to be achieved, the volume takeup of the brake system and the number of wheel brake devices whose residual pressure is to be decreased.

This actuating strategy may be repeated as often as required during braking, without reactions on the pedal force or the pedal travel. This may be required, for example, if, during braking, the driver raises the deceleration level (times t4 to t5 in FIG. 2b), and subsequently holds brake pedal 22 (see FIG. 1) constant again or below a specified travel change gradient (times t5 to t7 in FIG. 2b).

The speed at which booster body 26c of electromechanical brake booster 26 is moved during the active phase is essentially limited by dynamic ram pressures, which are able to lead to an unintentional increase in the hydraulic brake torque. The maximum volume flow is determined by the viscosity of the brake fluid and the throttling action of the valves situated in the brake system (see FIG. 1). Conditioned upon the temperature dependence of the viscosity of the brake fluid, for the optimization of the speed of booster body 26c, for instance, an environmental temperature or control unit temperature (of, for example, control unit 102) may be used.

Alternatively, the speed rate of the forward motion of the booster body may be reduced shortly before, or upon reaching a maximum pressure increase based on ram pressures, in order to avoid dynamic ram pressures in the brake system that are too great.

If the pressure reduction routine or the method is "disturbed" during the active phase by an increase of the driver's braking request, that is, if the driver is increasing the brake pedal travel, booster body 26c (see FIG. 2a) may be moved as quickly as possible in the direction of its initial position (position "0" in FIG. 2a), and at least one of the outlet valves may be opened as a function of the brake fluid volume displaced by the driver and/or the resulting master brake cylinder pressure, in order to enable an outflow of brake fluid into the fluid accumulator device/the low-pressure accumulator.

In another specific embodiment of the method described above, the increase of travel differential Δs (or differential travel), required for the pressure reduction, between input rod 26d and booster body 26c may be further reduced if booster body 26c, during the backwards displacement, is displaced slightly beyond its initial position. Provided no change in the pedal travel/pedal force characteristic curve is admissible, this travel difference should not be allowed to lead to an early reaching of the so-called jump-in threshold that is known to one skilled in the art.

This is achieved in that the travel difference before the reaching of the pedal travel at which the jump-in threshold is reached, is reduced to zero. If changes in the pedal travel/pedal force characteristic curve are admissible, the travel difference may also be kept up after exceeding the jump-in level, and pedal travel/pedal force characteristic curve, and the pedal travel/pedal force characteristic curve is displaced to the left, which means at an earlier time, when regarded from a temporal point of view.

Since after exceeding the jump-in threshold, a change in the travel difference of brake booster 26 is able to be noticed as a function of the amplitude of output rod 26g by the driver on brake pedal 22 by a force change, an activation of the method for residual pressure reduction during braking above the jump-in range, the speed of output rod 26g should be reduced to such an extent that the resulting gradient of the pedal force change is so slight that it is not perceived by the driver as disturbing. The further sequence of the method corresponds to the proceeding below the jump-in range assumed to be known.

Independently of the use of an electromechanical brake booster 26, for the reduction of the residual pressure, for instance, when using a vacuum brake booster during a lowering driver braking request, the outlet valves may be closed (see in FIG. 2b at times t7 to t8). In this context, the backward motion, initiated by the driver, of the master brake cylinder for sucking brake fluid from the wheel brake calipers is utilized. Of course, this passive pressure reduction method may also be carried out for each driver braking request reduction in systems without or with an electromechanical brake booster.

In the method described above, during the step of displacing booster body 26c from the end position back into the initial position, a first switch-over valve of the first brake circuit developed as the primary circuit is controlled into its opened state and a second switch-over valve of the second brake circuit used as the secondary circuit is controlled into its opened state. In this case, sometimes a reinforced pressure reduction may occur in the primary circuit, while the friction forces in the secondary circuit diminish the pressure reduction taking place therein. If an uneven pressure reduction in the two brake circuits is not desired, the method described below may be carried out.

Figure 3:
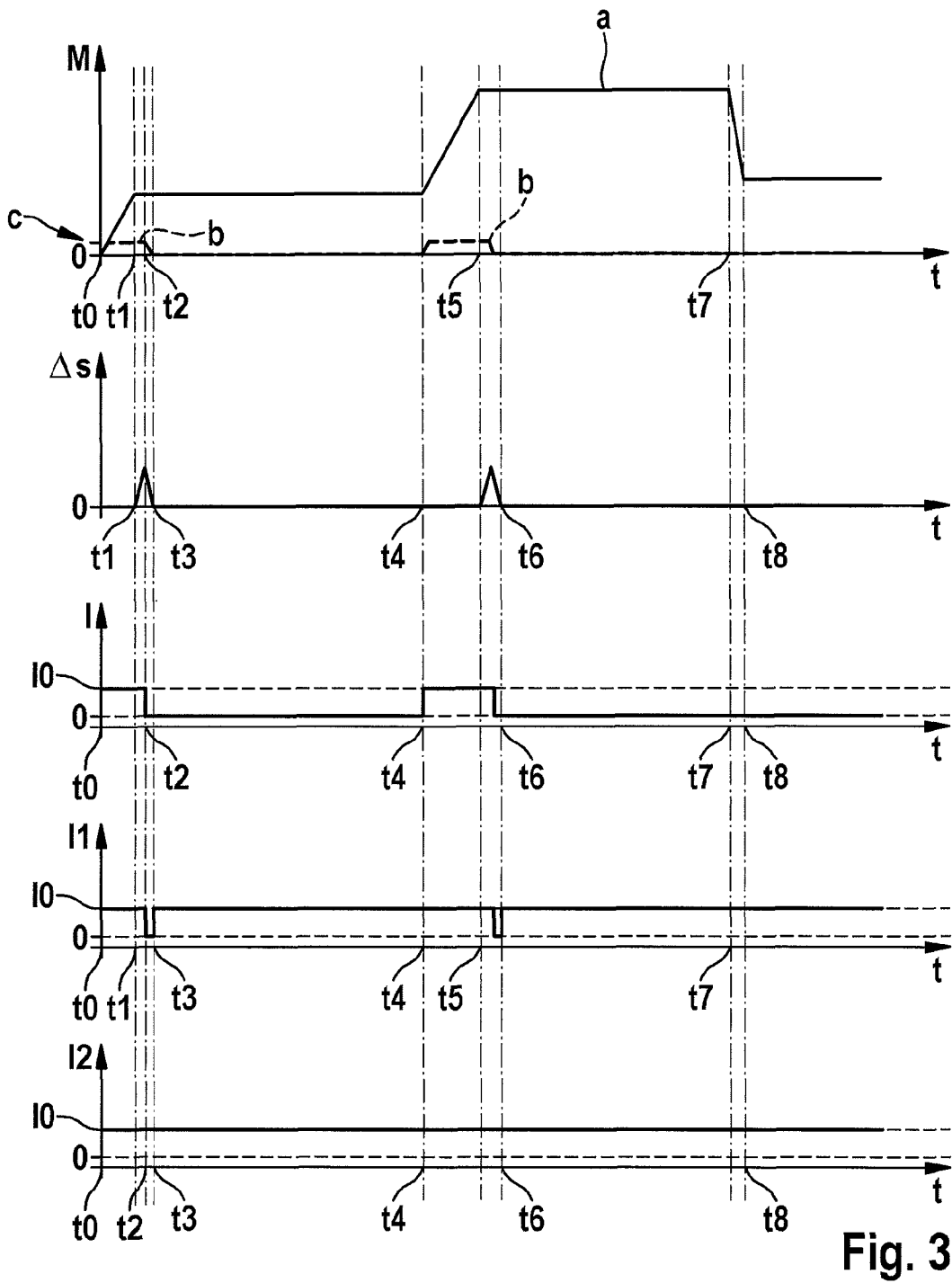
FIG. 3 time-dependent diagrams for explaining a second specific embodiment of the method for operating a brake system of a vehicle.

FIG. 3 shows time-dependent diagrams for explaining a second specific embodiment of the method for operating a brake system of a vehicle.

In all time-dependent diagrams of FIG. 3, the abscissa, showing time t (e.g. in seconds) reproduces a curve over time of the method described here. With reference to the top three diagrams of FIG. 3, we refer to the descriptions for FIG. 2b. The next to last diagram, on the ordinate, shows the supply of power I1 of the first switch-over valve of the first brake circuit developed as the primary circuit. Using the ordinate of the lowest diagram in FIG. 3, a supply of power I2 of the second switch-over valve of the second brake circuit developed as the secondary circuit is given. The first switch-over valve and the second switch-over valve are developed, for example, as currentless closed valves. Consequently, the first switch-over valve and the second switch-over valve are open at a current strength I0 (unequal to zero) and closed at a current strength equal to zero.

The driver brake command specified between times t0 to t8 corresponds to the specific embodiment described before. In the following, we shall therefore only go into specialties of the method described here.

In the method described here, during the step of displacing the booster body from the end position back into the initial position (between times t2 and t3), the first switch-over valve of the first brake circuit developed as the primary circuit is controlled into its closed state and the second switch-over valve of the second brake circuit developed as the secondary circuit may be controlled into its opened state. The closing of the first switch-over valve between times t2 and t3 prevents too great a volume flow from primary circuit/first brake circuit and, at the same time, increases the volume flow from the secondary circuit/second brake circuit. The pressure drop created between times t2 and t3 between the two brake circuits is removed after opening the first switch-over valve via a compensating motion of the floating piston. Consequently, the method described enables an equal volume flow from the two brake circuits, which effects a uniform pressure reduction in the two brake circuits.

In one specific embodiment of the method described in this document, one therefore does not have to put up with any (increased) residual grinding torque of the wheel brake devices of the secondary circuit/second brake circuit. Using the method steps described in the preceding paragraph, the recuperation efficiency may be additionally raised with them. It is pointed out that the method steps, carried out for this purpose, do not have an effect on the brake operating characteristic of the brake operating element operated by the driver. Thus, the driver is not disturbed in his driving convenience.

What is claimed is:

1. A method for operating a brake system for a vehicle, wherein the brake system includes a master brake cylinder coupled to an electromechanical brake booster having a booster body, the method comprising:
   controlling at least one wheel outlet valve of at least one wheel brake cylinder of at least one first brake circuit of the brake system in its open state, while taking into account at least one provided sensor signal with respect to an operating strength of an operation of a brake operating element situated on the master brake cylinder in such a way that a brake pressure buildup in the at least one first brake circuit becomes able to be limited to a response pressure of a fluid accumulator device of the respective brake circuit;
   displacing the booster body from an initial position relative to the master brake cylinder in a direction towards the master brake cylinder by a specified adjustment travel into an end position, in order to raise a travel differential between an input rod of the electromechanical brake booster and the booster body, during the step of displacing the booster body the at least one wheel outlet valve remaining opened; and
   displacing the booster body from the end position relative to the master brake cylinder in an opposite direction away from the master brake cylinder by the same specified adjustment travel back into the initial position, in order to reduce the travel differential between the input rod and the booster body, during the step of displacing the booster body from the end position back into the initial position the at least one wheel outlet valve being present in a closed manner in such a way that hydraulic fluid is sucked away from wheel brake devices that are coupled in a fluid manner to the brake system and assigned to wheels of the vehicle for a reduction of a hydraulic fluid pressure existing in the wheel brake devices.

2. The method as recited in claim 1, further comprising:
   if, during either step of displacing the booster body relative to the master brake cylinder, an increased driver braking request takes place, performing:
   immediately displacing the booster body into the initial position, and
   opening the at least one wheel outlet valve as a function of at least one of a quantity of a hydraulic fluid volume displaced by the driver and of a master brake cylinder pressure, so that hydraulic fluid is able to flow away into the fluid accumulator device.

3. The method as recited in claim 1, wherein the fluid accumulator device is a low-pressure accumulator.

4. The method as recited in claim 1, wherein the booster body is displaced as a function of at least one of a temperature of the hydraulic fluid, a temperature of a surroundings thereof, and a ram pressure of the hydraulic fluid existing in the brake system at a corresponding speed rate.

5. The method as recited in claim 1, wherein in the step of displacing the booster body back into the initial position, the booster body is displaced slightly over the initial position.

6. The method as recited in claim 1, wherein in response to a reduction in the driver's braking request, a corresponding release of pressure of the hydraulic fluid in the master brake cylinder is taken advantage of for reducing the pressure in the wheel brake devices, by, directly after a detection of the reduction of the driver's braking request, controlling all wheel outlet valves of the brake system into their closed state, so that hydraulic fluid is sucked from the wheel brake devices.

7. The method as recited in claim 1, wherein during the step of displacing the booster body from the end position back into the initial position, a first switch-over valve of the first brake circuit is controlled into its opened state and a second switch-over valve of a second brake circuit of the brake system is controlled into its opened state.

8. The method as recited in claim 1, wherein during the step of displacing the booster body from the end position back into the initial position, a first switch-over valve of the first brake circuit developed as a primary circuit is controlled into its closed state and a second switch-over valve of the second brake circuit developed as a secondary circuit is controlled into its opened state.

9. A control device for a brake system of a vehicle, comprising:
    an actuating device using which, while taking into account at least one provided sensor signal with regard to an operating strength of an operation of a brake operating element situated on the master brake cylinder of the brake system, at least one wheel outlet valve of at least one wheel brake cylinder of at least one brake circuit of the brake system is able to be controlled into its open state, so that a brake pressure buildup in the at least one brake circuit is able to be limited to a response pressure of a fluid accumulator device of the respective brake circuit, wherein:
        using the actuating device, in addition, while taking into account at least the provided sensor signal, an electromechanical brake booster is able to be actuated in such a way that, while a first one of the at least one wheel outlet valve remains opened, a booster body of the electromechanical brake booster is able to be displaced from an initial position relative to the master brake cylinder in a direction towards the master brake cylinder by a specified adjustment path into an end position, whereby a travel differential between an input rod of the electromechanical brake booster and the booster body is able to be raised, and
        after controlling of the at least one wheel outlet valve to its closed state, the booster body is able to be displaced from the end position relative to the master brake cylinder in an opposite direction away from the master brake cylinder, back by the same specified adjustment path into the initial position, whereby the travel differential between the input rod and the booster body is reducible in such a way that hydraulic fluid is able to be sucked from wheel brake devices that are coupled in a fluid manner to the brake system and assigned to wheels of the vehicle, for a reduction of a hydraulic fluid pressure that exists in the wheel brake devices.

10. A brake system for a vehicle, comprising:
    a control device for a brake system of a vehicle, including:
        an actuating device using which, while taking into account at least one provided sensor signal with regard to an operating strength of an operation of a brake operating element situated on the master brake cylinder of the brake system, at least one wheel outlet valve of at least one wheel brake cylinder of at least one brake circuit of the brake system is able to be controlled into its open state, so that a brake pressure buildup in the at least one brake circuit is able to be limited to a response pressure of a fluid accumulator device of the respective brake circuit, wherein:
            using the actuating device, in addition, while taking into account at least the provided sensor signal, an electromechanical brake booster is able to be actuated in such a way that, while a first one of the at least one wheel outlet valve remains opened, a booster body of the electromechanical brake booster is able to be displaced from an initial position relative to the master brake cylinder in a direction towards the master brake cylinder by a specified adjustment path into an end position, whereby a travel differential between an input rod of the electromechanical brake booster and the booster body is able to be raised, and
    after controlling of the at least one wheel outlet valve to its closed state, the booster body is able to be displaced from the end position relative to the master brake cylinder in an opposite direction away from the master brake cylinder, back by the same specified adjustment path into the initial position, whereby the travel differential between the input rod and the booster body is reducible in such a way that hydraulic fluid is able to be sucked from wheel brake devices that are coupled in a fluid manner to the brake system and assigned to wheels of the vehicle, for a reduction of a hydraulic fluid pressure that exists in the wheel brake devices.

\* \* \* \* \*